(12) United States Patent
Parks

(10) Patent No.: US 11,032,624 B2
(45) Date of Patent: *Jun. 8, 2021

(54) SYSTEM AND METHOD FOR PROVIDING AN ALERT AND AD WHILE DELIVERING DIGITAL CONTENT

(71) Applicant: Charley M. Parks, Austin, TX (US)

(72) Inventor: Charley M. Parks, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/805,794

(22) Filed: Mar. 1, 2020

(65) Prior Publication Data
US 2020/0204873 A1    Jun. 25, 2020

Related U.S. Application Data

(63) Continuation of application No. 16/153,311, filed on Oct. 5, 2018, now Pat. No. 10,587,933.

(51) Int. Cl.
| | |
|---|---|
| *H04N 21/81* | (2011.01) |
| *G06Q 30/02* | (2012.01) |
| *H04N 21/44* | (2011.01) |
| *H04N 21/488* | (2011.01) |
| *G06N 20/00* | (2019.01) |

(52) U.S. Cl.
CPC ....... *H04N 21/812* (2013.01); *G06Q 30/0264* (2013.01); *H04N 21/44016* (2013.01); *H04N 21/4882* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2014/0078039 A1* | 3/2014 | Woods | H04N 21/442 345/156 |
| 2016/0234566 A1* | 8/2016 | Suoknuuti | H04N 21/4307 |

* cited by examiner

*Primary Examiner* — Omar S Parra

(57) ABSTRACT

The present invention discloses a system and method for providing an alert on delivering a digital content such as when an interesting digital content is imminent, for example, the beginning of a play during a football game, to direct the focus of one or more viewers towards the digital content. The present invention is further configured to embed a commercial message in conjunction with the alert on directing the focus of the viewers. The system is adapted to activate the alert either manually or automatically. Further, the system is optionally implemented with an artificial intelligence (AI) system, which is trained using deep learning to recognize the appropriate time to automatically trigger the alert/commercial message sequence. The AI system could be trained by monitoring the manual control of alert activation.

8 Claims, 3 Drawing Sheets

SYSTEM AND METHOD FOR PROVIDING AN ALERT AND AD WHILE DELIVERING DIGITAL CONTENT

BACKGROUND OF THE INVENTION

A. Technical Field

The present invention generally relates to digital content delivery, and more specifically relates to a system and method for providing an alert for a point of interest within the digital content and then using the heightened attention of the viewers to more efficiently present a commercial message.

B. Description of Related Art

For many years, suppliers have advertised their goods and services to the general public in order to increase business and/or distinguish themselves from their competitors. For close to fifty years, television advertising has provided a means to reach millions of potential viewing consumers. Over the years, advertisers have attempted to focus their advertisements towards individuals who are most likely to be positively affected by the ads. On early Saturday mornings, many television ads are often geared towards children who tend to watch the morning programs. On the other hand, during the late evening news, the ads are typically directed to a more mature audience. The technique of targeting is based on crude demographic assumptions.

However, viewers of video programs, via television, computer video, mobile device video, broadcast network, cable network, streaming provider or other forms, often become distracted by their environment and may miss significant information. Further, providers of video entertainment, must maintain a balance between recouping their cost of acquiring content and overloading the programming with commercial messages to the point that viewers decide to choose a different means of entertainment. Both NFL (football) and MLB (baseball) leagues are struggling with this issue and considering whether changes are needed to speed game play and/or make the programming more compelling to the viewers.

Although most commercial messages are shown during breaks in a video program's presentation, embedded advertising is also used in several different ways. Blue screen technology is often used to show a static commercial message behind home plate during a baseball game. Corporate logos are sometimes included as a static element included at the top or bottom of the screen during some sports or business programming. Corporate logos also appear on screen between plays in some sporting events, but they are not accompanied by an attention alert.

Some networks will place a promotional graphic on a portion of the screen and call attention to it with an audio chime. This approach is distinct from the present invention in that the audio chime is intended to call attention to the promo rather than to a point of interest within the main program. In fact, the promo usually takes place during short breaks in the action that are not long enough for a 30 second commercial. Emergency broadcast tests and weather warnings use an attention alert to call attention to the main message of the video, i.e., the emergency message, but do not exploit the enhanced attention of the viewers to show a commercial message.

Therefore, there is a need for a system and method for providing an alert when an interesting content is imminent, for example, the beginning of a play during a football game, to direct the focus of one or more viewers towards the digital content, and then to show a commercial message while the viewers' attention is enhanced.

SUMMARY OF THE INVENTION

The present invention discloses a system and method for providing an alert when an interesting content is imminent, for example, the beginning of a play during a football game, to direct the focus of one or more viewers towards the digital content. The present invention is further configured to embed a commercial message in conjunction with the alert on directing the focus of the viewers.

In an embodiment, the present invention comprises an operator device associated with an operator, one or more viewer devices associated with one or more viewers, a network, and an alert system. In one embodiment, the alert system comprises an alert server and at least one database. In some embodiments, the operator could be an employee or other agent of the entity transmitting the program to viewer. In one embodiment, the operator device is enabled to access the alert system via the network for providing an alert to direct the focus of the viewers to the viewer device. In one embodiment, the activation of the alert is implemented with an artificial intelligence (AI) system. In one example, the artificial intelligence (AI) system is trained using deep learning to recognize the appropriate time to automatically trigger the alert/commercial message sequence. In this case, the AI system could be trained by monitoring the manual control of alert activation.

In one embodiment, a method for providing an alert on delivering a digital content is disclosed. In one embodiment, the method is incorporated in a system comprising, a computational device comprising a processor and a memory unit, a database in communication with the computational device for storing alert related information and information related to commercial messages, an operator device configured to access the computational device via a network, and one or more viewer device associated with one or more viewer in communication with the server via the network. At one step, the method includes displaying a commercial message or digital content. At another step, the method includes providing the alert signal for directing the focus of the viewer to the imminent occurrence of a feature of interest in the digital content being delivered. Optionally, the method may include enabling the viewer to turn off the alert.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The embodiments herein will be better understood from the following detailed description with reference to the drawings, in which.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention discloses a system and method for providing an alert on delivering a digital content such as when an interesting digital content is imminent, for example, the beginning of a play during a football game, to direct the focus of one or more viewers towards the digital content. The present invention is further configured to embed a commercial message in conjunction with the alert on directing the focus of the viewers.

Figure 1:
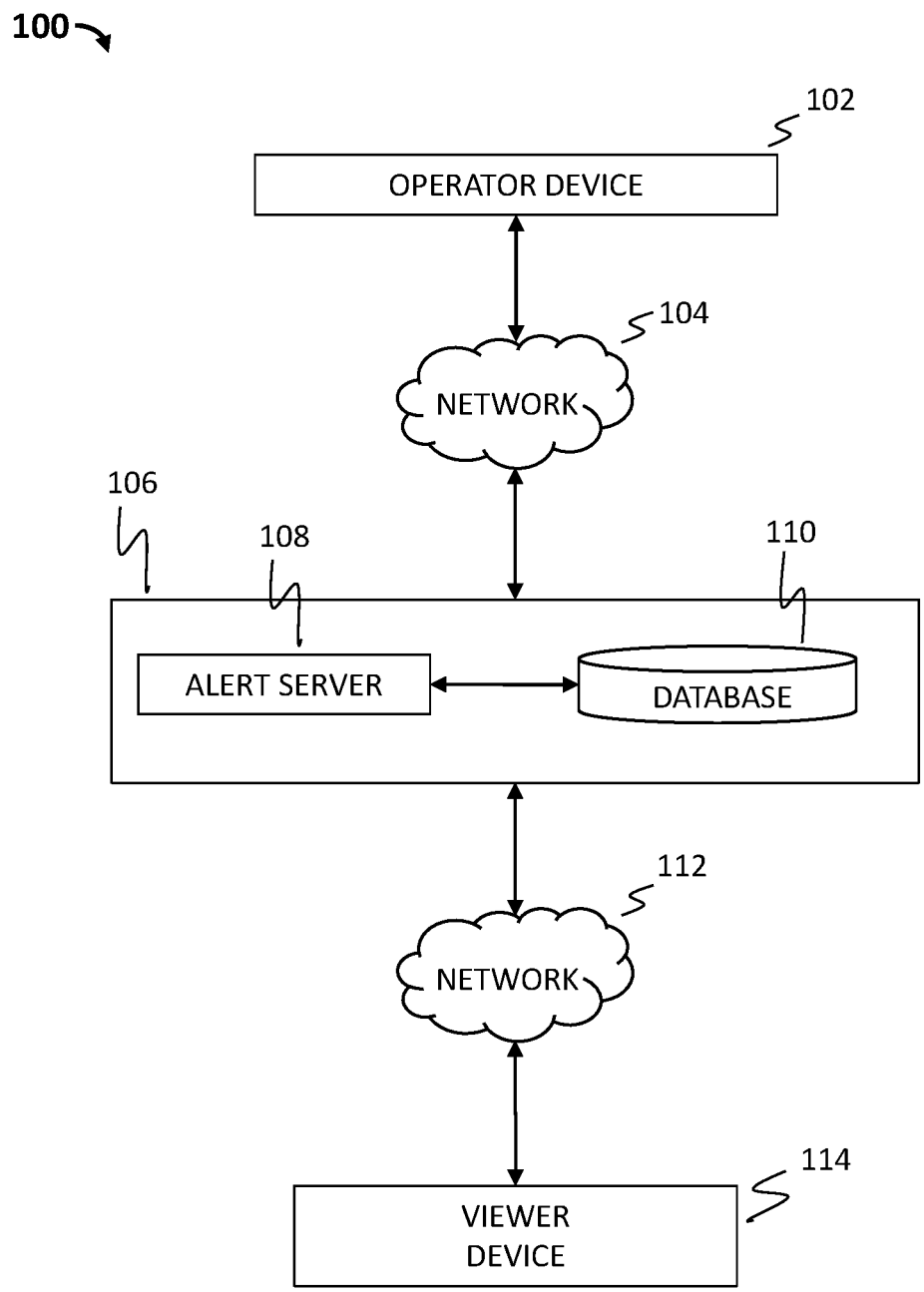
FIG. 1 exemplarily illustrates an environment implemented in accordance with various embodiments of the invention.

Referring to FIG. 1, a block diagram of an environment 100 implemented in accordance with various embodiments of the present invention is disclosed. The environment 100 comprises an operator device 102 associated with an operator, one or more viewer devices 114 associated with one or more viewers, a network 104, and an alert system 106. In an embodiment, the alert system 106 comprises an alert server 108 and at least one database 110. In an embodiment, the operator device 102 is enabled to access the alert system 106 either directly or via the network 104 for providing an alert in conjunction with a feature of interest to direct the focus of the viewers to the viewer device 114. In one embodiment, the operator device 102 is enabled to access the alert system 106 via the network 104 for providing alert to direct the focus of the viewers to the viewer device 114. In one embodiment, the digital content is an audio content or a video content.

In an embodiment, the operator could be an employee or other agent of the entity transmitting the program to viewers. In an embodiment, the operator device 102 is at least one of a video switcher, special effects generator, or other electronic devices. In one embodiment, the operator device 102 is in communication with the network 104 to access the alert server 108. In an embodiment, the network 104 could be based on ITU 656, SMPTE 259M, HD-SDI, SMTE 372M, SMPTE 424M, or IP. In an embodiment, the viewer device 114 is at least one of a television receiver, a desktop, a laptop, a tablet, a mobile phone, handheld electronic devices, a virtual reality device, an augmented reality device, a virtual retinal display, or a bionic contact lens. In one embodiment, one or more viewer device 114 is in communication with the network 112 to receive digital content, alerts, and commercial messages from the alert server 108.

In one embodiment, at least one database 110 may be accessible by the alert server 108. The database 110 may be integrated into the alert server 108 or separate from it. In some embodiments, the database 110 resides in a connected server or in a cloud computing service. Regardless of location, the database 110 comprises a memory to store and organize certain data for use by the alert server 108. In some embodiments, the database stores alert related information and information related to commercial messages. In one embodiment, the feature of interest includes resumption of play during a sporting event, an imminent breaking of a record in a timed event and an unusual or exciting element of play that develops without a break in the action during a sporting event.

Figure 2:
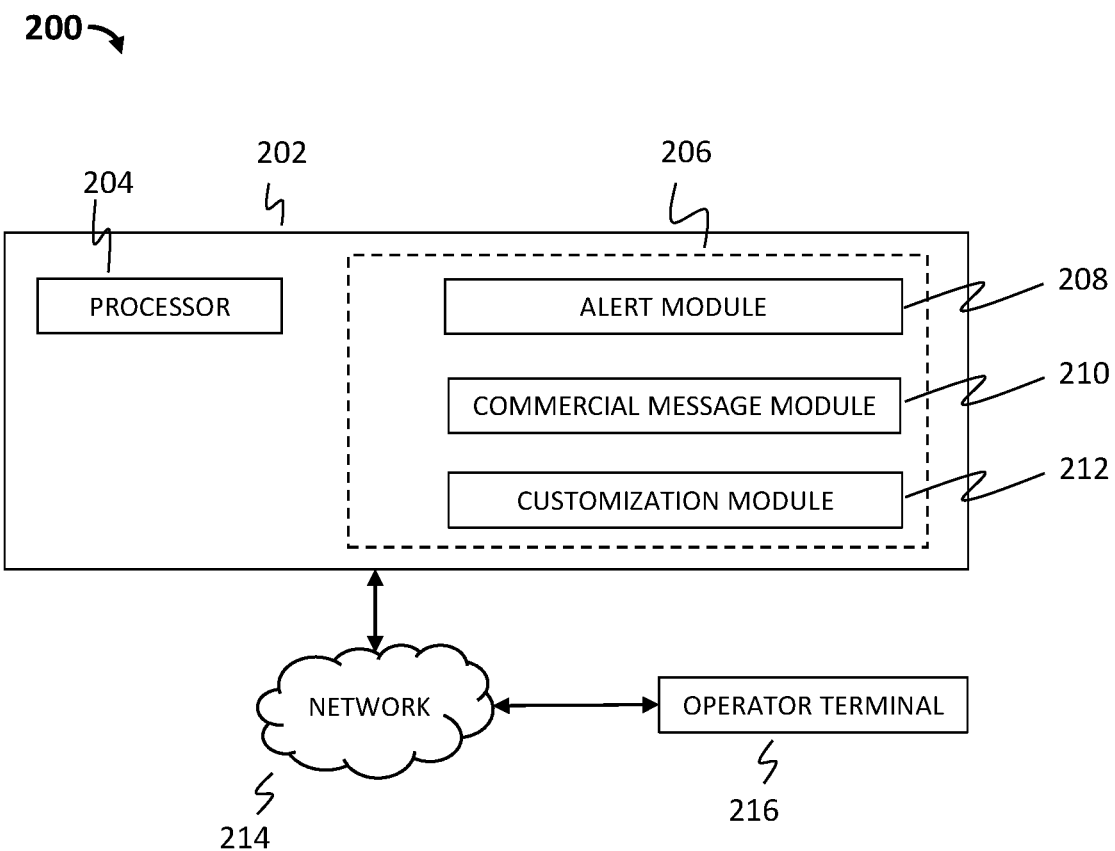
FIG. 2 exemplarily illustrates a block diagram of an alert server, according to an embodiment of the present invention.

In one embodiment, the alert server 108 is at least one of a general or special purpose computer. The alert server 108 could be operated as a single computer, which can be a production quality video switcher or effects generator, a hardware and/or software server, a workstation, a desktop, a laptop, a tablet, a mobile phone, a mainframe, a supercomputer, a server farm, and so forth. In some embodiments, the computer could be touchscreen and/or non-touchscreen and adapted to run on any type of OS, such as iOS™ Windows™, Android™, Unix™, Linux™ and/or others. In one embodiment, the plurality of computers is in communication with each other, via networks. Such communication can be via a software application, a mobile app, a browser, an OS, and/or any combination thereof. Further, a block diagram 200 of an exemplary implementation of the alert server (108 or 202) is illustrated in FIG. 2.

The operator device 102 is associated with an employee or other agent of the entity transmitting the program to viewers. The employee is enabled to access the alert server 108 to transmit the alert to cause the viewers of a video program to re-engage with the program or event. In an example, the viewer may have been talking to other people around them, using another device such as a smart-phone, getting a snack, snoozing, or otherwise paying less than full attention to the program. When the alert is activated, i.e. indicating that something of interest is imminent in the program, the viewers are apt to turn their attention to the program or event. During this interval of enhanced attention, a commercial message is presented to the viewer via the system 106.

In an embodiment, the commercial message could have any desired temporal relationship with the attention alert, alert or alert signal. In one embodiment, the commercial message begins before the activation of the attention alert. In one embodiment, the commercial message begins after the activation of the attention alert. In one embodiment, the commercial message is aired at the same time as the activation of the attention alert. In one embodiment, the commercial message begins before the end of the alert active period. In one embodiment, the commercial message begins after the end of the alert active period. In one embodiment, the commercial message begins at the same time as the end of the alert active period. In one embodiment, the commercial message ends before, after, or at the same time as the activation of the attention alert. In one embodiment, the commercial message ends before, after, or at the same time as the end of the alert active period. According to the present invention, in case of the commercial message starting before the attention alert is used to psychically reward the viewer who is engaged enough to guess when the commercial message will begin, thus increasing his feelings of connection with the network or streamer, and their advertisers.

In another embodiment, the system 106 is adapted to provide alerts to viewers as a service, without the distraction of an accompanying commercial message. It could be used, for example, when a game has more plays than the number of ads that have been sold. Choices for the broadcaster or streamer in that situation might be to provide free commercial message to their best customers, use a message that advertises their own service, provide the attention alert with no commercial message, or forgo the attention alert for the rest of the program. Given many viewers' negative opinions regarding advertising, the lack of a commercial message could actually serve as a virtual or subliminal commercial message by enhancing the program provider's reputation in the minds of the viewers.

FIG. 2 is a block diagram 200 of the alert server 202 in an embodiment of the present invention. The server 202 comprises a processor 204 and a memory unit 206. The memory unit 206 comprises a set of program modules comprises an alert module 208, a commercial message module 210 and a customization module 212. In one embodiment, the operator accesses server 202 via an operator terminal 216 via a network 214. In some embodiments, the network 214 is at least any one of an ITU 656, SMPTE 259M, HD-SDI, SMTE 372M, SMPTE 424M, or IP based network. In some embodiments, the operator terminal 216 is at least any one of production quality video switcher or special effects generator, a desktop, a laptop, a tablet, a mobile phone, mobile and/or handheld electronic devices, personal digital assistants, smart phones, smart televisions, palmtops and phablets. The alert module 208, executed by the processor 204, is configured to trigger an alert for directing the focus of one or more viewers to the viewer device. The commercial message module 210 coupled to the alert module 208, executed by the processor 204, is configured to display the commercial message during delivery of the digital content. In one embodiment, the alert is triggered on time to direct the focus of the viewer to an imminent occurrence of a feature of interest in the digital content being aired or presented. A commercial message is presented while the viewers' attention has been enhanced by the alert.

In one embodiment, the alert is at least one of an aural, a visual and a tactile stimulus alert or combination thereof. In another embodiment, the alert could be of any type that causes the viewer to re-engage in the process of consuming the program, including but not limited to a tone, series of tones, audio clip, or a visual screen effect such as flashing, scrolling, darkening, earthquake effect, insertion of unrelated video, or other. In yet another embodiment, the alert could be of haptic type alert such as shaking, vibrating, etc., in the case of a smart-phone, tablet, augmented reality glasses, or other types of equipment that are in physical contact with the viewer. In one embodiment, the attention alert is activated on the viewer device where digital content is displayed. In another embodiment, the attention alert is provided using a viewer device such as a smart phone associated with the viewer. The customization module 212, executed by the processor 204, enables the viewer to register to receive alerts or deactivate alerts in their smartphone.

In one embodiment, the commercial message is used as the alert, which is provided at an appropriate time and in an appropriate way to serve the purpose. In one embodiment, the commercial message type alert comprises a prominent video effect. For example, a large corporate logo with a clear background could be flashed several times on the screen, or "flown" into the space between the offensive line and a quarterback who is in the shotgun formation during a football game. Generally, this type of alert is timed to occur just before a play begins. In an embodiment, the audio type alert is at least any one of doorbell, horn, readily recognizable riff, jingle, a sound associated with the advertiser, an actual increase in volume or the perceived increase in volume often associated with advertising or other similar means of attention-getting audio effects.

In an embodiment, the attention alert is triggered manually by the employee or other agent of the entity transmitting the program to viewers. In an example, the employee would be monitoring the video program in a control room or other facility. In the ideal case, he would have access to multiple camera views of the action, since the broadcast view is not always the best one for determining when a play or pitch will happen. When a segment of interest, such as a football play or a baseball pitch, is imminent, the individual activates a control to initiate the attention alert/commercial message sequence. This approach takes advantage of the repetitive sequence of events in a typical live sports event. For example, the ball cannot be put into play in football until all but one of the players have been in position for a full second. In baseball, the pitcher typically nods to signal agreement with the type of pitch called for by the catcher, then delivers the ball two or three seconds later. Further, when pitching from the stretch position, the pitcher must come to a stop for a full second before delivering the ball to the plate.

In one embodiment, the alert activation is implemented with an artificial intelligence (AI) system. In one example, the artificial intelligence (AI) system is trained using deep learning to recognize the appropriate time to automatically trigger the alert/commercial message sequence. In this case, the AI system could be trained by monitoring the manual control of alert activation.

In one embodiment, the commercial message is at least any one of photographic image, drawing, or short video, with or without accompanying audio. In one embodiment, the video type commercial message could be an animated line drawing that allows the background to be displayed. In another embodiment, the commercial message is a visual image of any kind displayed in a picture-in-picture window in the portion of the main screen most likely to capture the viewers' attention when they re-engage with the program.

In the case of a baseball game, the commercial message could be shown on the patch of open infield to the right of the pitcher or the commercial message could be a corporate logo superimposed on the part of the screen between offensive line and quarterback in a football game. This form of the commercial message could optionally be combined with an audio track that supplements the message delivered by the logo. If the broadcaster or streamer were insensitive to the inevitable push back from the viewers, the commercial message could even briefly utilize the full screen. In cases where even a small logo or picture-in-picture video commercial would be considered overly intrusive, the commercial message may take the form of an audio clip. The audio could be anything that is associated with the company sponsoring the ad, such as a recognizable jingle, a spoken message, or other audio that would make the program viewers think of the sponsor.

In some embodiments, one or more forms for providing an alert on delivering a digital content or a commercial message is disclosed as follows. In one embodiment, one or more tones are presented about one half of a second and then, a logo of an advertiser is displayed on a portion of the screen for about one second. In another embodiment, a short musical selection is played (such as all or part of one of the well-known musical riffs associated with the various networks' sports programming), coincident with a one-second display of a line art animation with a clear background that allows the main video to show through (such as one displaying a humpback whale breaching, with a company name displayed below the animation).

In yet another embodiment, one or more tones are sounded as an attention alert, followed by a picture-in-picture video commercial message. In yet another embodiment, a corporate logo serves as its own attention alert by flying into or around the screen before settling into the area likely to attract the focus of most viewers. In yet another embodiment, a series of alert tones precedes a short audio message from a sponsor, such as a jingle, tag line, special offer, or other audio-only content. In yet another embodiment, haptic attention alert with audio/video commercial message is delivered. In an example, A viewer using augmented reality glasses in a noisy live venue may receive an attention alert via a vibration or shaking of the glasses, with a commercial message delivered on the surface of the glasses and/or through the audio capability of the glasses or a linked device such as Bluetooth headphones.

In yet another embodiment, a distinctive jingle or other sound associated with their company is used as the attention alert at the beginning of a commercial message consisting of a logo or video, with or without accompanying additional audio content. In yet another embodiment, the employee of the network or streaming provider may use the lack of an actual commercial message to enhance their reputation with viewers, which lack of commercial message serves as a virtual commercial message.

Figure 3:
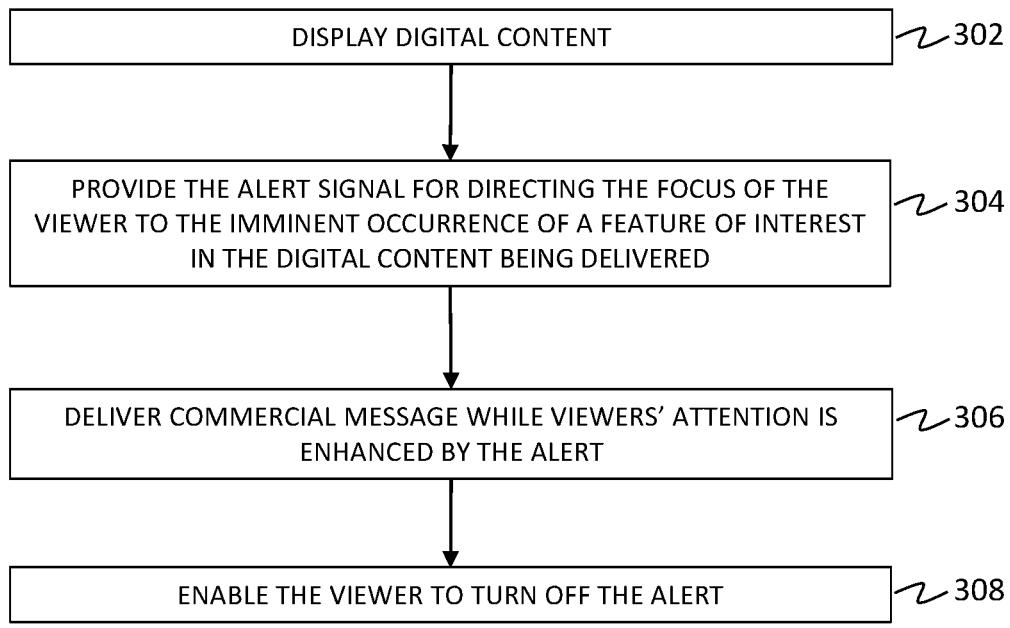
FIG. 3 exemplarily illustrates a flowchart for providing alert on delivering a digital content, according to an embodiment of the present invention.

Referring to FIG. 3, a method 300 for providing an alert on delivering a digital content is illustrated. In one embodiment, the method 300 is incorporated in a system comprising, a computational device comprising a processor and a memory unit, a database in communication with the computational device for storing alert related information, information related to commercial messages, an operator device configured to access the server via a network, and one or more viewer device associated with one or more viewer in communication with the server via the network. At step 302, the method 300 includes displaying digital content. At step 304, the method 300 includes providing an alert for directing focus of one or more viewers to an imminent display of a feature of interest in the digital content being delivered. At step 306, the method 300 includes presenting a commercial message while the viewers are focused on the digital content optionally, at step 308, the method 300 includes enabling the viewer to turn off the alert.

Advantageously, the present invention places commercial message in line with the digital content being aired, potentially allowing fewer or smaller commercial breaks. In addition, the present invention helps the viewer to enjoy the program more fully by increasing the likelihood that they are paying attention, for example, while the ball is in play. Further, the present invention also has the potential to minimize the occurrence of someone walking in front of the screen or otherwise obstructing it just as a play begins, by giving them advance notice to stop momentarily. The present invention speeds the play of several major sports by potentially allowing the removal or shortening of some of the commercial breaks, while helping to ensure that viewers don't miss critical action within the game.

Although a single embodiment of the invention has been illustrated in the accompanying drawings and described in the above detailed description, it will be understood that the invention is not limited to the embodiment developed herein, but is capable of numerous rearrangements, modifications, substitutions of parts and elements without departing from the spirit and scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

The invention claimed is:

1. A method for providing an alert on delivering a digital content, comprising:
   providing the alert signal to a viewer device for directing the focus of the viewer to the imminent occurrence of a feature of interest in the digital content being delivered, and
   presenting a commercial message to the viewer at least partially during the time the focus of the viewer has been directed to the feature of interest in the digital content, wherein the feature of interest comprises the resumption of play during a sporting event following a brief stoppage that was not caused by a change in the score.

2. The method of claim 1 incorporated in a system comprising a computational device comprising a processor and a memory unit, including hardware and software suitable for mixing audio/video signals, comprising at least one of a specialized hardware and software device comprising at least one of a video switcher, effects generator, character generator, or sound mixing board, or general purpose computer hardware comprising at least one of a server, mainframe computer, minicomputer, workstation, tower computer, desktop computer, or notebook computer, with software specialized for mixing audio/video signals, wherein the computational device is triggered by one of: a manually operated input device or an artificial intelligence (AI) system which is trained using deep learning to recognize the appropriate time to trigger the alert;
   a database in communication with the computational device for storing alert related information and information related to commercial messages, and one or more viewer devices associated with one or more viewers in communication with the computational device via a network for distribution of the digital content,
   wherein the digital content is an audio content or a video content.

3. The method of claim 1, wherein the alert is an integral part of the commercial message, comprising at least one of a distinctive sound, a real or perceived increase in volume, a video effect, or a tactile stimulus effect.

4. The method of claim 1, wherein the temporal relationships are unconstrained between the start and end of the alert versus the start and end of the commercial message.

5. The method of claim 1, wherein the alert and commercial message are presented on different devices.

6. The method of claim 1, wherein the alert is at least one of an aural, a visual and a tactile stimulus alert.

7. The method of claim 1, wherein said commercial message comprises at least one of audio clip, a static logo, a photographic image, a drawing, a video message, an animated line drawing, a visual image displayed within a portion of the screen, a visual image briefly displayed using the full screen, a subliminal message, or a virtual message.

8. The method of claim 1, wherein the viewer device comprises at least one of television receiver, a computer, an electronic tablet, a smart phone, a smart television, a virtual reality device, an augmented reality device, a virtual retinal display, or a bionic contact lens.

* * * * *